April 2, 1940.  G. A. STONESTREET  2,195,942
ICE CREAM PACKING MACHINE
Filed Jan. 18, 1939   5 Sheets-Sheet 1

INVENTOR
G. A. STONESTREET
By
Young, Emery & Thompson
ATTYS.

April 2, 1940.　　G. A. STONESTREET　　2,195,942
ICE CREAM PACKING MACHINE
Filed Jan. 18, 1939　　5 Sheets-Sheet 2

INVENTOR
G. A. STONESTREET
By
Young, Emery & Thompson
ATTYS.

April 2, 1940.　　G. A. STONESTREET　　2,195,942
ICE CREAM PACKING MACHINE
Filed Jan. 18, 1939　　5 Sheets-Sheet 3

INVENTOR
G. A. STONESTREET
BY
Young, Emery & Thompson
ATTYS.

April 2, 1940.  G. A. STONESTREET  2,195,942
ICE CREAM PACKING MACHINE
Filed Jan. 18, 1939   5 Sheets-Sheet 4

INVENTOR
G. A. STONESTREET
BY
Young, Emery & Thompson
ATTYS.

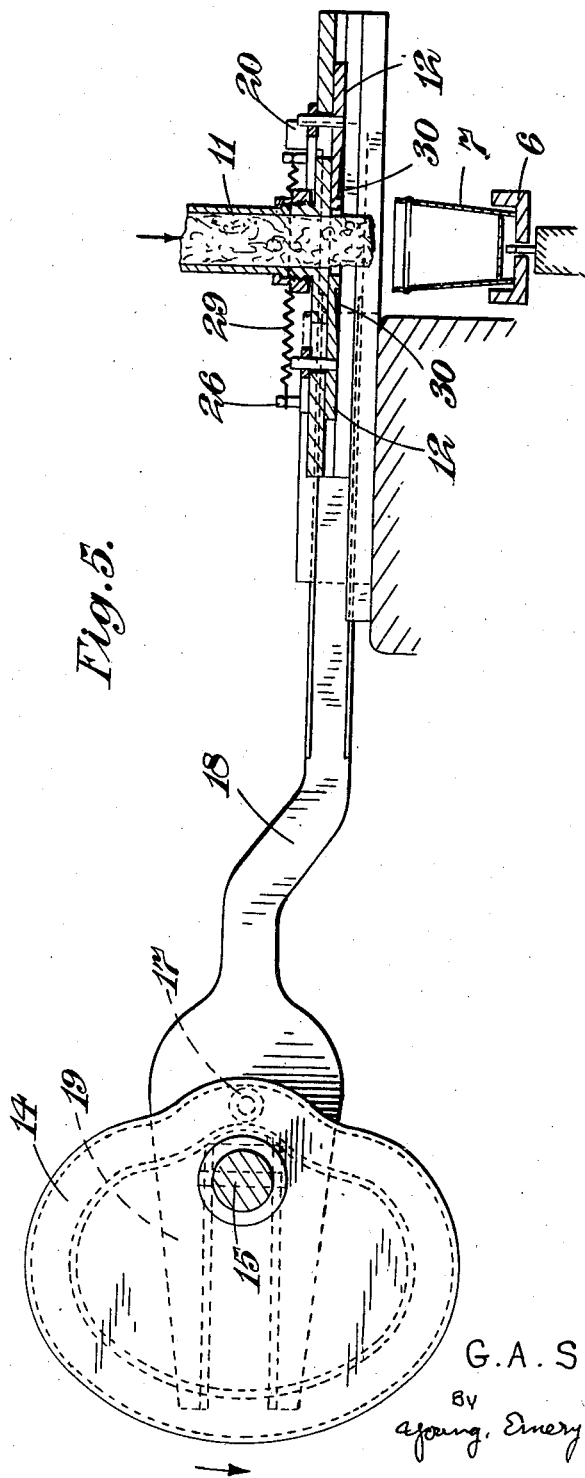

Patented Apr. 2, 1940

2,195,942

UNITED STATES PATENT OFFICE 2,195,942

ICE CREAM PACKING MACHINE

George Alec Stonestreet, London, England, assignor to T. Wall & Sons Limited, London, England, a British company Application January 18, 1939, Serial No. 251,643
In Great Britain June 28, 1938

2 Claims. (Cl. 226—95)

The invention consists in improvements in or relating to ice cream packing machines and is concerned with machines for packing measured quantities of ice cream into cups or cartons of the kind comprising a separator for automatically separating the cups from a stack, means for feeding the separated cups, one at a time, to a filling station and means at that station for delivering the measured quantities of the cream into the cups. The machine may also include means for automatically inserting cover discs into the cups. An object of the invention is to provide, in machines of this kind, means for delivering the measured quantities of the cream to the cups which are of a particularly simple nature and which will deliver cream in a more solid condition than is usually possible and with little mechanical working of the cream with the result that the packed cream has a particularly good texture. A further object of the invention is the provision of delivery means which will render machines of the above kind particularly suitable for use in conjunction with continuous freezers.

The invention provides an ice cream packing machine of the kind described characterized by a feed conduit arranged for feeding a continuous supply of ice cream to the filling station and a cut-off valve in the conduit and preferably at the end thereof comprising a blade or blades movable transversely to the length of the conduit and operating in timed relationship with the cup separator and feeder first to open the conduit to allow a predetermined length of cream to be fed through the conduit and then, when a cup is at the filling station, to close the conduit and to cut off, for delivery to the cup, the length of cream which has been fed. Preferably the conduit is connected to the outlet of a continuous freezer arranged to deliver partly frozen cream at a substantially constant rate.

Conveniently the period during which the valve is opened is timed to correspond with the dwell of a cup at the filling station. The valve may comprise two blades slidable towards and away from one another in a common plane, like a pair of sliding doors, and arranged to come together to cut off the cream at a position substantially centrally of the conduit. Preferably the machine is so arranged that as the cream is cut off by the valve it drops into the cup by gravity and the blade, or each of the blades when there are more than one, is undercut on its lower face behind the cutting edge to provide clearance between the blade and the cream and thereby to lessen any tendency of the cream to adhere to the blade.

In order to prevent freezing of the valve and consequent sticking of the blade or blades warming means such as an electric heater or tubes for the circulation of warm water may be provided for the blade or blades.

When the packing machine according to the invention is employed in conjunction with a continuous freezer giving a substantially constant feed of cream the amount of cream fed to each cup depends upon the length of time the valve is open and in order to enable the quantity fed to be varied without interruption in the operation of the freezer the machine may include means for varying the speed of operation of the cup separator and feeder and the cut-off valve without disturbing their timed relationship and independently of the operation of the freezer.

A specific example of the application of the invention to a known form of ice cream packer will now be described with reference to the drawings accompanying the provisional specification, in which—

Figure 5 is a section on the line 5—5 in Figure 4.

Like reference numerals indicate like parts in the several figures of the drawings.

Figure 1:
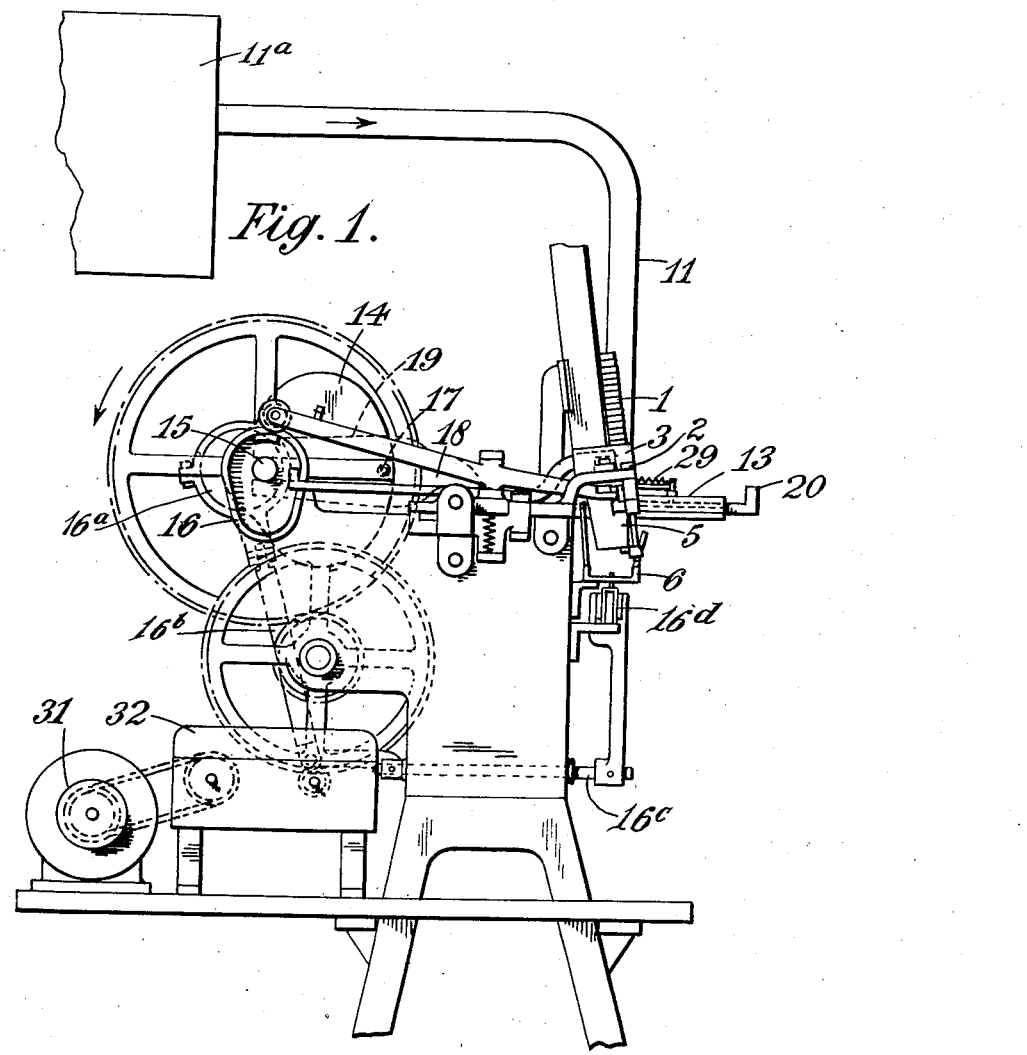
Figure 1 is a side view of the machine.
Figure 2:
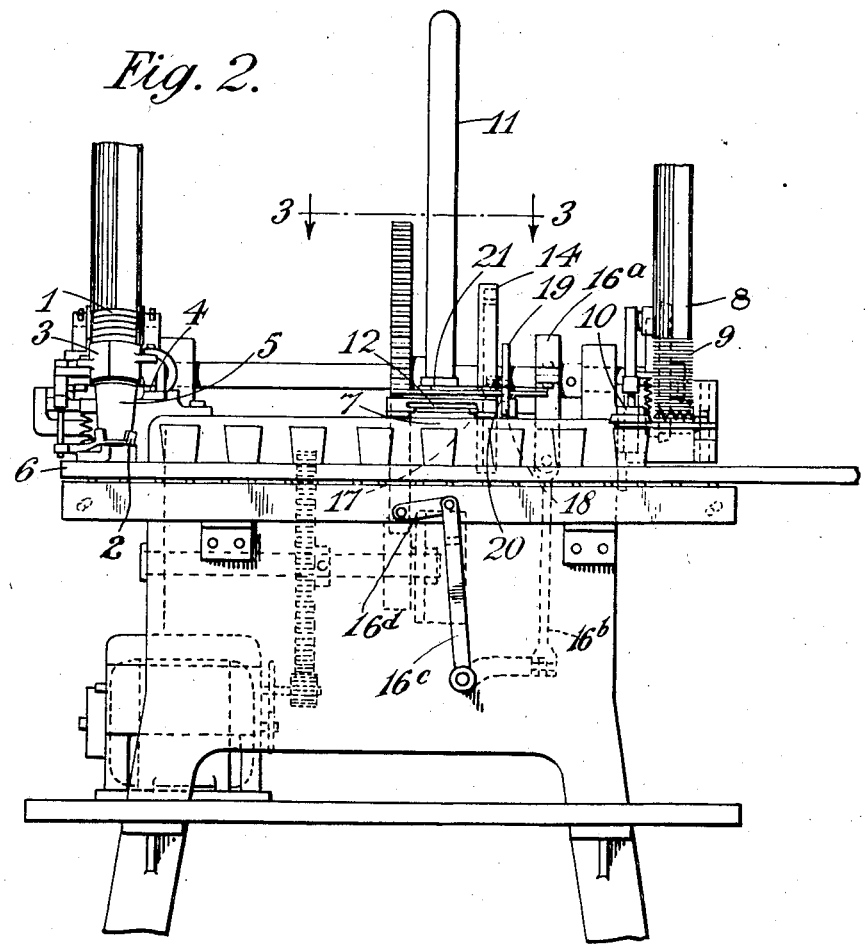
Figure 2 is an elevation of the machine.

In the machine shown in the drawings the cups, which are of the usual waxed card type, are separated from a stack 1 by means comprising a movable stop 2 on which the stack rests, grippers 3 which grip the stack around the lowermost cup but one and stripper mechanism 4 which, when the stack is being gripped by the grippers 3 and the stop 2 has been moved out of engagement with the stack, presses the lowermost cup 5 on to a reciprocatory conveyor 6. When the cup has been forwarded clear of the stack by the conveyor the stop 2 then returns to its original position and the grippers 3 release the stack to allow it to fall on to the stop ready for the separation of the next cup. The conveyor 6 operates with an intermittent motion and carries the cups one at a time to the filling station 7. After the cups have been filled they are then conveyed to the capping station 8 where waxed cover discs are separated from a stack 9 and inserted into the mouths of the cups. The separating mechanism for the discs comprises a stepped slide arranged to push each disc in turn as it reaches the bottom of the stack underneath a plunger 10 which presses the discs into the cups as they reach the station 8.

Figure 3:
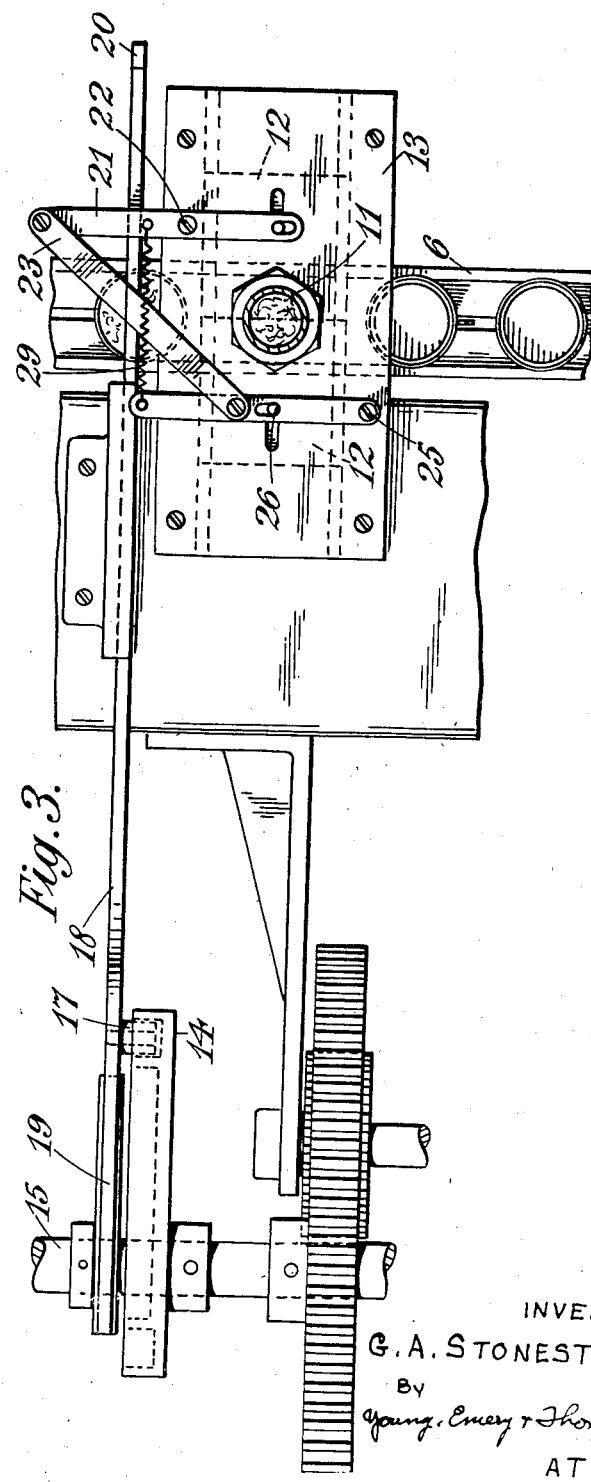
Figure 3 is a view on the line 3—3 of Figure 2 showing in plan the cut-off valve and operating mechanism, the valve being in the closed position.
Figure 4:
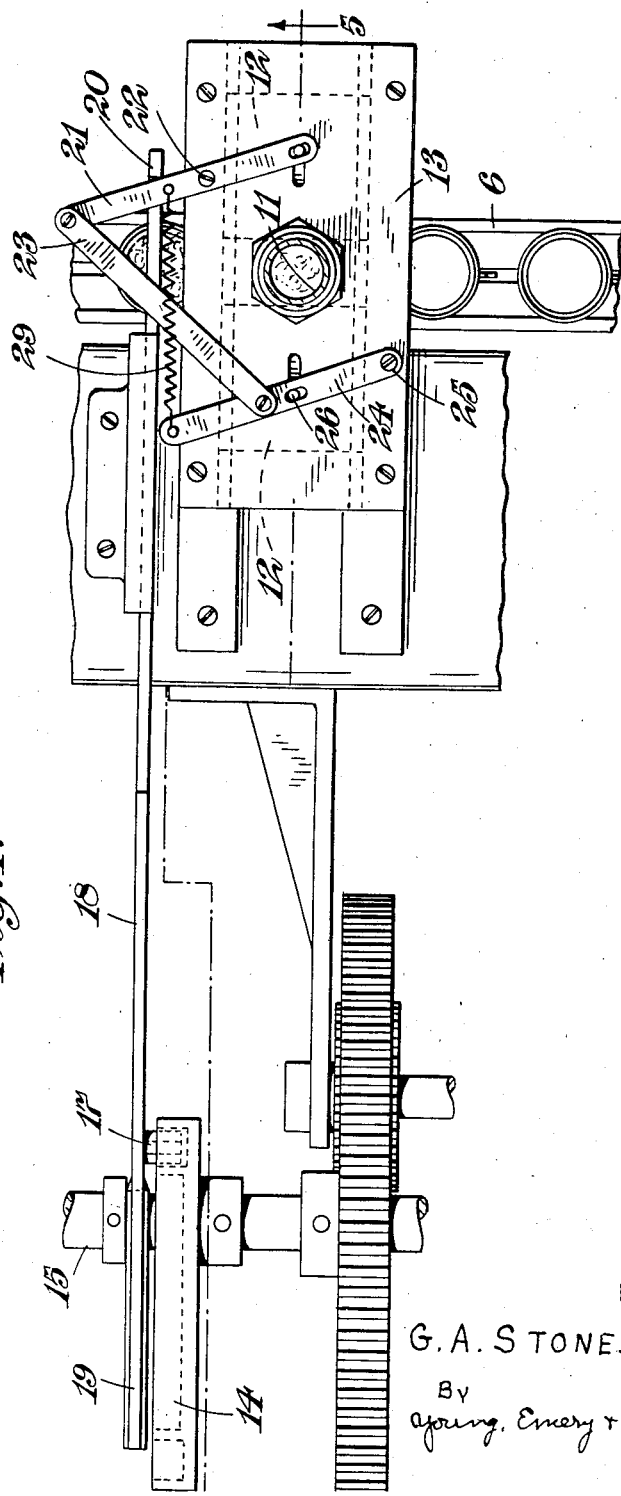
Figure 4 is a view similar to Figure 3 but with the valve in the opened position.

The ice cream is fed to the machine from a continuous freezer indicated diagrammatically at 11a through a pipe 11 which has provided at its mouth, in accordance with the invention, a cut-off valve comprising two blades 12 slidable in guides 13. The blades are operated in timed relationship with the cup separating mechanism and the conveyor 6 by means of a cam 14 carried on a shaft 15 which also carries the cam 16 operating the separator mechanism and the eccentric 16a which imparts the reciprocatory movements to the conveyor by means of the eccentric rod 16b, the bell crank 16c and link 16d. The cam 14 co-operates with a roller 17 on the rod 18 which is guided horizontally by means of a forked end 19 engaging the shaft 15. At its front end the rod 18 is provided with an upstanding stop 20 which, as the rod moves to the left from the position shown in Figure 3 to that shown in Figure 4, engages a lever 21 which is pivoted to the fixed guide 13 at 22 and swings the lever into the position shown in Figure 4 and with it the right hand valve blade 12. The lever 21 is connected by a cross-link 23 to a second lever 24 which is pivoted at 25 to the guide 13 and is connected to the left hand valve blade 12 by a pin 26, the arrangement being that the left hand blade is moved in the opposite direction to the right hand blade. During the time that the valve is open ice cream is fed through the pipe 11 as shown at 28 in Figure 5 and as the stop 20 moves to the right the valve closes under the action of a spring 29 cutting off the length of cream which has been fed and allowing it to fall into the cup underneath the valve.

The valve blades 12 are undercut as shown at 30 to provide clearance between the body of the blades and the ice cream which is being cut off.

The timing of the opening and shutting of the valve in relation to the cup separating and feeding mechanism is such that the valve opens as each cup comes to rest at the filling station and is closed during the movement of the cups.

In order that the amount of cream fed to each cup may be adjusted without varying the rate of feed from the freezer and without disturbing the timed relationship between the opening of the valve and the feeding of the cups the machine is driven by means of a motor 31 the speed of which may be adjusted to vary the rate of operation of the machine and therefore to vary the duration of the valve opening and consequently the amount of cream fed at each opening of the valve. A change speed gear box 32 is also included in the drive to enable large adjustments of the speed of operation to be made so that the machine can be adapted to the filling of cups of widely different sizes.

I claim:

1. A machine for producing and packing measured quantities of ice cream into cups, of the kind comprising a continuous freezer having an outlet conduit leading to a filling station for the cups, a separator for automatically separating the cups from a stack, and means for feeding the separated cups, one at a time, to the filling station at a position where they lie under the mouth of the conduit, a cut-off valve at the mouth of the conduit which includes two blades slidable towards and away from one another transversely across the mouth of the conduit in a common plane, like a pair of sliding doors, and arranged to come together at a position within the width of the mouth, and means for moving the blades in this manner in timed relationship with the cup separator and feeder first to open the mouth of the conduit to the full cross-sectional area of the conduit to allow a predetermined length of cream to be fed through the conduit and then, when a cup is at the filling station, to close the mouth of the conduit and to cut off the length of cream which has been fed, the arrangement being such that the length of cream which has been cut off drops freely into the cup which is at the filling station.

2. A machine for packing measured quantities of ice cream into cups or cartons, comprising a separator for automatically separating the cups from a stack, means for feeding the separated cups, one at a time, to a filling station and means for measuring and delivering predetermined quantities of the cream at that station into the cups comprising a feed conduit arranged for feeding a continuous supply of ice cream to the filling station, a cut-off valve for the conduit which includes two blades slidable towards and away from one another transversely to the length of the conduit in a common plane, like a pair of sliding doors, and arranged to come together at a position intermediate in the width of the conduit and means for moving the blades in this manner in timed relationship with the cup separator and feeder first to open the conduit to allow a predetermined length of cream to be fed through the conduit and then, when a cup is at the filling station, to close the conduit and to cut off, for delivery to the cup, the length of cream which has been fed, the said means comprising a cam rotatable in timed relationship with the operating means for the cup separator and feeder, a follower for the cam, a reciprocatable rod carrying the follower, means for constraining the rod to move axially in a straight path, and link mechanism for transmitting the axial movements of the rod to one of the blades in the same direction as the movement of the rod and to the other blade in the opposite direction.

GEORGE ALEC STONESTREET.